United States Patent
Fußstetter et al.

(10) Patent No.: US 12,409,596 B2
(45) Date of Patent: Sep. 9, 2025

(54) PINNING DEVICE, CASTING UNIT AS WELL AS STRETCHING UNIT

(71) Applicant: BRÜCKNER MASCHINENBAU GmbH, Siegsdorf (DE)

(72) Inventors: Stefan Fußstetter, Traunstein (DE); Florian Adler, Siegsdorf (DE); Anton Edfelder, Unterwössen (DE); Günter Oedl, Salzburg (AT); Anthimos Giapoulis, Traunstein (DE); Peter Maurer, Rohrdorf (DE); Florian Kellnberger, Grafing (DE)

(73) Assignee: Brückner Maschinenbau GmbH, Siegsdorf (DE)

( * ) Notice: Subject to any disclaimer, the term of this patent is extended or adjusted under 35 U.S.C. 154(b) by 289 days.

(21) Appl. No.: 18/358,415

(22) Filed: Jul. 25, 2023

(65) Prior Publication Data
US 2024/0042668 A1 Feb. 8, 2024

(30) Foreign Application Priority Data
Jul. 28, 2022 (DE) ...................... 10 2022 118 971.6

(51) Int. Cl.
B29C 48/88 (2019.01)
B29C 48/08 (2019.01)

(52) U.S. Cl.
CPC ............ *B29C 48/914* (2019.02); *B29C 48/08* (2019.02)

(58) Field of Classification Search
CPC ... B29C 48/914; B29C 48/08; B29C 48/9165; B29C 33/026; B29C 41/26; B29C 48/35
See application file for complete search history.

(56) References Cited

FOREIGN PATENT DOCUMENTS

| DE | 19653749 A1 | 6/1998 |
|---|---|---|
| JP | 2009234195 A | 10/2009 |
| JP | 2013010301 A | 1/2013 |

OTHER PUBLICATIONS

Search Report for Application No. DE 10 2022 118 971.6, dated Mar. 17, 2023, 8 pages.

*Primary Examiner* — Stella K Yi
(74) *Attorney, Agent, or Firm* — Nixon & Vanderhye P.C.

(57) ABSTRACT

A pinning device for the electrostatic pinning of a film on a chill roll is disclosed having a first coil unit, a second coil unit, a pinning region situated between the coil units, a high-voltage source as well as at least two electrodes. At least the first electrode of at least two electrodes is strip-shaped. The electrodes run from the first coil unit to the second coil unit in the pinning region and high voltage is applied to both electrodes by the high-voltage source.

20 Claims, 6 Drawing Sheets

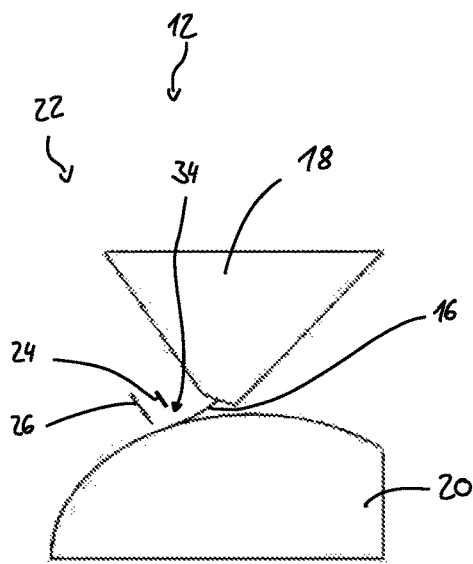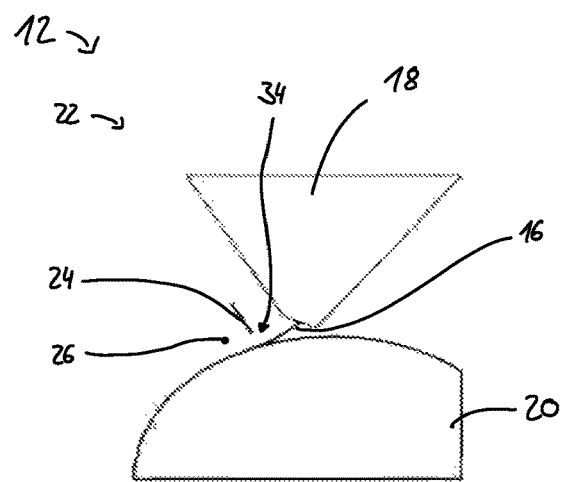
Fig. 12
Fig. 13
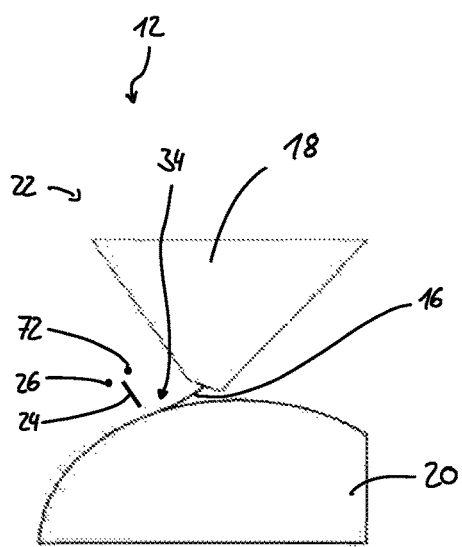
Fig. 14

PINNING DEVICE, CASTING UNIT AS WELL AS STRETCHING UNIT

CROSS RELATED APPLICATION

This application claims priority to German Application DE 10 2022 118 971.6, filed Jul. 28, 2022, the entire contents of which is hereby incorporated by reference.

FIELD OF THE DISCLOSURE

The disclosure relates to a pinning device for the electrostatic pinning of a film on a chill roll, a corresponding casting unit as well as a stretching unit with such a casting unit.

BACKGROUND

In the manufacture of thin plastics films, a film of a plastics melt is initially applied to a chill roll, on which it cools and solidifies. To ensure homogeneous cooling and thus homogeneous material properties, the film needs to be applied to the chill roll along its entire width uniformly, in fact continuously along its length.

To avoid the film being deformed by mechanical pinning solutions, the generation of an electric field with high field strengths in proximity to the chill roll surface is known by means of electrodes, through said electric field the film is to pass through. Due to the electric field, the polar molecules of the film are aligned and the surface of the chill roll becomes electrically charged. An electrostatic attraction forms between the film and the chill roll so that the film applies itself to the chill roll uniformly and automatically.

To generate such an electric field with strong electric field strengths, a very high voltage of 9 kV or more is required however at the electrodes that can thus result in sparkovers between the electrodes and the chill roll. Such sparkovers damage the surface of the chill roll and also reduce the quality of the film produced.

SUMMARY

There is provided a pinning device, a casting unit as well as a stretching unit in which sparkovers are reduced.

For this purpose a pinning device for the electrostatic pinning of a film on a chill roll is provided, comprising a first coil unit, a second coil unit, a pinning region situated between the coil units, a high-voltage source as well as at least two electrodes, wherein at least the first electrode of at least two electrodes is strip-shaped. The electrodes run from the first coil unit to the second coil unit in the pinning region and high voltage is applied to both electrodes by the high-voltage source.

By using two strip-shaped electrodes, to which high voltage is applied to both, a homogeneous electric field is generated that has particularly high electric field strengths, in particular maximum field strengths, at the point at which the film comes into contact with the chill roll. By focusing the electric field, the high voltage can be reduced in comparison to other solutions in order to generate the same electric field strength. By reducing the high voltage in the electrodes, the tendency for sparkovers is thus also reduced, thereby causing fewer sparkovers or avoiding sparkovers completely.

For example, the high voltage has a voltage between 5 kV and 10 kV, in particular it is between 7 kV and 9 kV. The high voltage can even be up to 20 kV.

In an embodiment, the second electrode of at least two electrodes is also strip-shaped or is wire-like, in particular a wire, thereby making it possible to improve the homogeneity of the electric field further.

In an embodiment, a third electrode is provided, wherein the third electrode is strip-shaped or is wire-like, in particular a wire. By means of the third electrode, the homogeneity of the electric field is increased further.

For example, the electrodes run parallel to each other, thereby making the electric field very homogeneous.

Both electrodes can each comprise two lateral faces, wherein the electrodes each face each other with one of their lateral faces. In this way, the homogeneity of the electric field is increased further.

The lateral faces run in particular parallel to each other.

In one aspect, the electrodes have a spacing to each other of 3 mm to 15 mm, in particular 5 mm to 10 mm, in the pinning region, thereby achieving a particularly good focusing of the electric field.

For example, the electrodes are the same width, thereby increasing the homogeneity of the electric field further. Differing widths are also conceivable, thereby making it possible to influence the position of the maximum field strengths.

The width of the electrodes can be between 3 mm and 15 mm, in particular greater or equal to 4 mm and less than 13 mm, thereby achieving a very homogeneous electric field.

To be capable of adapting the electrodes to the specifics of the casting unit, the electrodes can be offset in the direction of their widths or arranged to be flush.

For example, the direction of the width equals the radial direction of the roller.

In an embodiment, one, several or all of the electrodes are moveable in their longitudinal direction between the first coil unit and the second coil unit, in particular wherein at least one rotatable coil is provided in the first or the second coil unit, on which said rotatable coil one, several or all of the electrodes are partially coiled. As a result, deposits on said one, several or all electrodes that impair the quality of the electric field can be transported away.

For example, a rotatable coil is located in each of the coil units for each of the electrodes, on said rotatable coil the corresponding electrode is coiled partially.

In particular, at least one of the rotatable coils is powered.

In an embodiment, one, in particular the second electrode, or several of the electrodes are static, in particular wherein a mechanical tensioning device is provided in the second coil unit, wherein said one or several static electrodes are attached to the tensioning device in the second coil unit and fixed in position in the first coil unit. In this way, the complexity of the pinning device is simplified.

In an embodiment, a voltage application device is provided in at least one of the coil units, in particular in both coil units, said voltage application device connecting the electrodes electrically to said at least one high-voltage source, thereby ensuring a reliable application of high voltage to the electrodes.

For example, a joint high-voltage source is provided for both coil units or each coil unit has a separate high-voltage source.

In an embodiment, the voltage application device comprises a roller, on which the first electrode is guided, and/or the voltage application device has a curved guiding surface, along which the second electrode and/or the third electrode is guided. This facilitates a reliable and space-saving contacting of the electrodes.

For example, the external side of the guiding surface is a circular sector.

To prevent undesired vibrations of the electrodes, the second coil unit comprises a damping device that is configured to dampen the vibrations of the electrodes in the pinning region.

The electrodes, for example, are guided through the damping device out of the corresponding coil unit.

In particular, the vibrations to be dampened have an amplitude perpendicular to the lateral faces of the electrodes, in the direction of the width of the electrodes and/or are torsional vibrations about the longitudinal axis of the electrodes.

For example, the damping device comprises a damping roller whose rotational axis is perpendicular to the longitudinal direction and perpendicular to the direction of the width of the electrodes, wherein the damping roller is mounted movably in the direction of the width and rests on one edge of each of the electrodes, in particular on the edge facing away from the chill roll. Thus, a damping device can be realised with only a damping roller.

Alternatively or additionally, the damping device comprises two damping rollers whose rotational axes are perpendicular to the longitudinal direction and parallel to the direction of the width of the electrodes, wherein each of the electrodes rests on one of the damping rollers. In this way, each electrode is dampened separately, thereby ensuring that the electrodes do not mutually affect each other.

The damping rollers rest in particular on the lateral faces of the electrodes.

Both electrodes run through, for example, between both damping rollers.

In an embodiment, the pinning device comprises several insulating devices, in particular insulating conduits, insulating grommets and/or bushing insulators, which extend from the relevant coil unit towards the pinning region, wherein the electrodes run through the insulating devices, in particular wherein at least one of the insulating devices is provided for each of the electrodes on each of the coil units. By means of the insulating devices, sparkovers are reliably prevented outside the pinning region.

For example, the insulating devices are made of polyether ether ketone (PEEK), in particular made of annealed polyether ether ketone.

The insulating devices enclose the electrodes at least at the edge facing the chill roll.

In an embodiment, the insulating devices are attached in a vibration-damping manner to the damping device in order to minimise vibrations of the electrode guided therein.

In a further embodiment, low voltage is applied to at least one of the electrodes, in particular in addition to the application of the high voltage, thereby heating the electrode being applied with low voltage and thus reducing deposits and condensate on the electrode as such deposits and condensate primarily form on cold surfaces.

For example, due to the low voltage, an electric current can form between both coil units via each of the electrodes. In particular, the electrodes are not grounded so that the electric current comes to a standstill in the event of a crack in the electrode.

The low voltage has, for example, a maximum voltage of 150 V, for example between 60 V and 130 V, in particular 120 V. The electric current generated by the low voltage can have a strength of current that is between 1 A and 8 A.

For example, the pinning device comprises a low-voltage source for this. The high-voltage source and the low-voltage source can be designed as one device.

The object is also solved by means of a casting unit, containing at least a slot die, a chill roll and a pinning device as described previously, in particular wherein the chill roll is grounded.

Through the high voltage applied and the grounding of the chill roll, a small electric current is formed, termed pinning current.

In the case of a high voltage of 20 kV, the current is, for example, in the region of 25 mA and 30 mA. In the case of high voltage of 9 kV, a current can form ranging from about 9 mA to 12 mA.

If an electrode cracks, the high-voltage source is switched off. A crack in the electrode can be detected by edge detection.

The features and advantages described for the pinning device apply equally to the casting unit and vice versa.

The electrodes can have a spacing to the chill roll of at least the thickness of the film, for example at least 2 mm and/or a maximum of 20 mm.

Moreover, the object is solved by means of a stretching unit for producing a film, in particular a transverse direction orienter, a machine direction orienter and/or simultaneous stretching unit, comprising an oven and a casting unit as previously described.

The features and advantages described for the pinning device and/or the casting unit apply equally to the stretching unit and vice versa.

BRIEF DESCRIPTION OF THE DRAWINGS

Additional features and advantages of the disclosure are found in the following description as well as the attached drawings to which reference is made. In the drawings:

FIGS. 12, 13, 14 show schematic sections through a third, fourth and fifth embodiment of the pinning device during operation, respectively.

DETAILED DESCRIPTION

Lists having a plurality of alternatives connected by "and/or", for example "A, B and/or C" are to be understood to disclose an arbitrary combination of the alternatives, i.e.

the lists are to be read as "A and/or B and/or C" or as "at least one of A, B or C". The same holds true for listings with more than three items.

Figure 1:
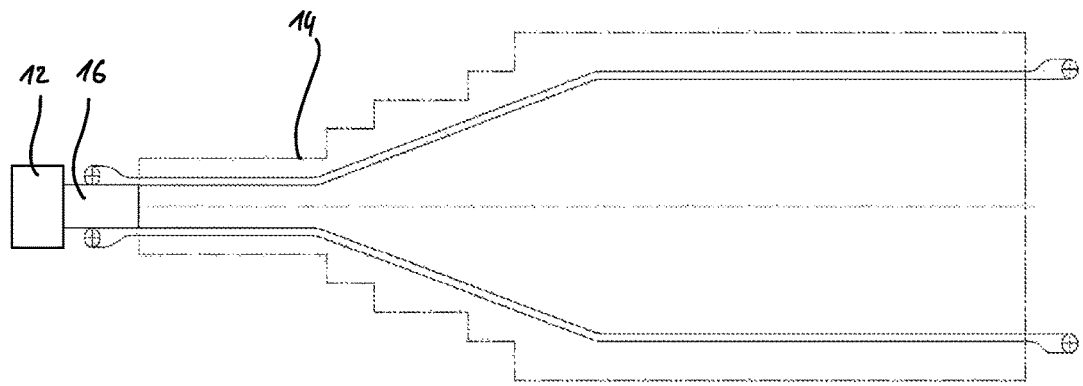
FIG. 1 shows a stretching unit according to the disclosure comprising a casting unit according to the disclosure in a schematic view.

FIG. 1 shows a stretching unit 10 according to the disclosure for producing a film comprising a casting unit 12 and an oven 14. The stretching unit 10 is for example a transverse direction orienter, a machine direction orienter and/or simultaneous stretching unit.

To produce the film, the casting unit 12 in the present example initially generates a film 16 (also termed "cast film") that is fed into the oven 14. In the oven 14, the film 16 is stretched in a known manner in the longitudinal direction and/or the transverse direction, thereby producing a mono-axially or bi-axially oriented film.

Figure 2:
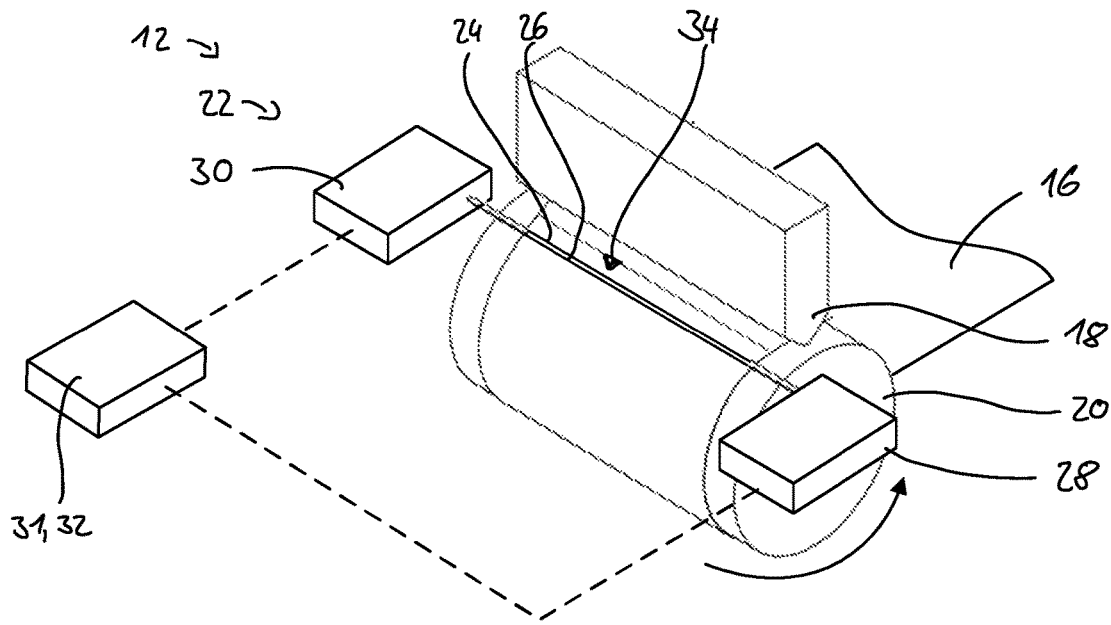
FIG. 2 shows the casting unit according to FIG. 1 comprising a pinning device according to the disclosure in a schematic, perspective view.

In FIG. 2, the casting unit 12 is shown in an enlarged schematic view.

The casting unit 12 shown here comprises a slot die 18, a chill roll 20 as well as a pinning device 22.

The chill roll 20 is cooled.

The slot die 18 is located above the chill roll 20 and is configured to continually apply a plastic melt onto the chill roll 20 which forms the film 16. The plastic used is in particular a polyethylene terephthalate (PET) but is not limited to this.

The film 16 is then applied by means of the pinning device 22 to the chill roll 20 uniformly. The chill roll 20 rotates here in the view according to FIG. 2 anticlockwise. The film 16 generated in this way is ultimately detached from the chill roll 20, in the shown embodiment after about a three quarters rotation of the chill roll 20, if necessary cooled further and fed into the oven 14.

The pinning device 22 is an electrostatic pinning device and comprises two electrodes, namely a first electrode 24 and a second electrode 26, two coil units, namely a first coil unit 28 and a second coil unit 30, a low-voltage source 31 as well as a high-voltage source 32.

In the shown embodiment, the low-voltage source 31 and the high-voltage source 32 are designed as one device. The low-voltage source 31 and the high-voltage source 32 can also be designed as separate devices.

The coil units 28, 30 are located in the axial direction of the chill roll 20 in front or behind the chill roll 20. A pinning region 34 is configured between both coil units 28, 30, said pinning region 34 as seen in the axial direction of the chill roll 20 also includes the region of the film 16 on the chill roll 20.

The electrodes 24, 26 are each both attached to each of the coil units 28, 30 and extend between both coil units 28, 30, i.e. also through the pinning region 34.

Figure 3:
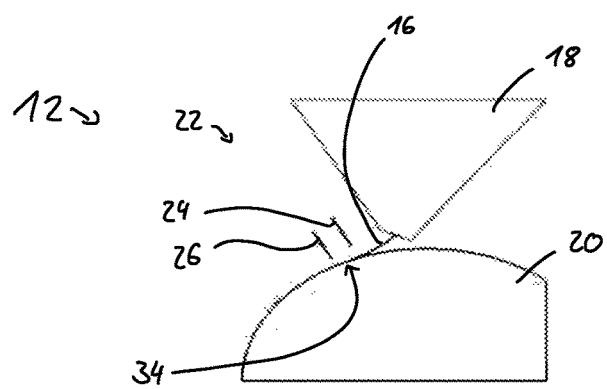
FIG. 3 shows schematically a cross section through the casting unit during operation.

In FIG. 3, a schematic view of the casting unit 12 is shown in the axial direction of the chill roll 20. For simplification, only the electrodes 24, 26 are shown from the pinning device 22.

The electrodes 24, 26 are strip-shaped in the shown first embodiment, i.e. they have a width that is a lot longer than their thickness, in particular longer by one order of magnitude. In addition, they have a length in their longitudinal direction that is greater by one order of magnitude than their width.

The electrodes 24, 26 thus have two lateral faces, which extend in the longitudinal direction of the electrode 24, 26 and in the direction of their width, as well as two edges. One of the edges is facing the chill roll 20 and one of the edges is facing away from the chill roll 20. The direction between the edges of the same electrode 24, 26 is termed the direction of the width of the electrodes 24, 26.

In the first embodiment, both electrodes 24, 26 have the same width, for example between 3 mm and 15 mm, in particular a width that is greater or equal to 4 mm and less than 13 mm. For example, a width of 12.7 mm is conceivable.

In the shown embodiment, the electrodes 24, 26 each point to the other electrode 24, 26 with one of its lateral faces. The lateral faces and therefore also both electrodes 24, 26 run parallel to each other, at least in the pinning region 34.

In the pinning region 34, the electrodes 24, 26 have a spacing to each other of 3 mm to 15 mm, in particular 5 mm to 10 mm.

Both electrodes 24, 26 are arranged to be flush to each other in the direction of their width, i.e. a connecting line of their edges is perpendicular to the lateral faces.

In particular, the direction of the width for one of the electrodes 24, 26 equals the radial direction of the chill roll 20.

The electrodes 24, 26 are located in the rotational direction of the chill roll 20 after the slot die 18. For example, the electrodes 24, 26 have a spacing to the chill roll 20 of at least the thickness of the film 16, for example at least 2 mm. At the most, they have a spacing to the chill roll 20 of 20 mm.

High voltage is applied to the electrodes 24, 26 by the high-voltage source 32. The high voltage is, for example, between 5 kV and 10 kV, in particular between 7 kV and 9 kV.

The chill roll 20 is grounded so that a strong electric field forms in the pinning region 34, through said electric field the film 16 is guided.

In addition, a weak electric current forms which is called a pinning current. In the case of a high voltage of 20 kV, the current is, for example, at about 30 mA. In the case of high voltage of 9 kV, a current of about 12 mA can form.

If one of the electrodes 24, 26 cracks, the high-voltage source is switched off. A crack in one of the electrodes 24, 26 can be detected by the high-voltage source by means of edge detection.

Similarly, low voltage is applied to at least one, in particular both electrodes 24, 26 by the low-voltage source 31. The low voltage is, for example, less than 150 V, in particular between 60 V and 130 V, for example 120 V. The high voltage and the low voltage are in cascade accordingly.

Figure 4:
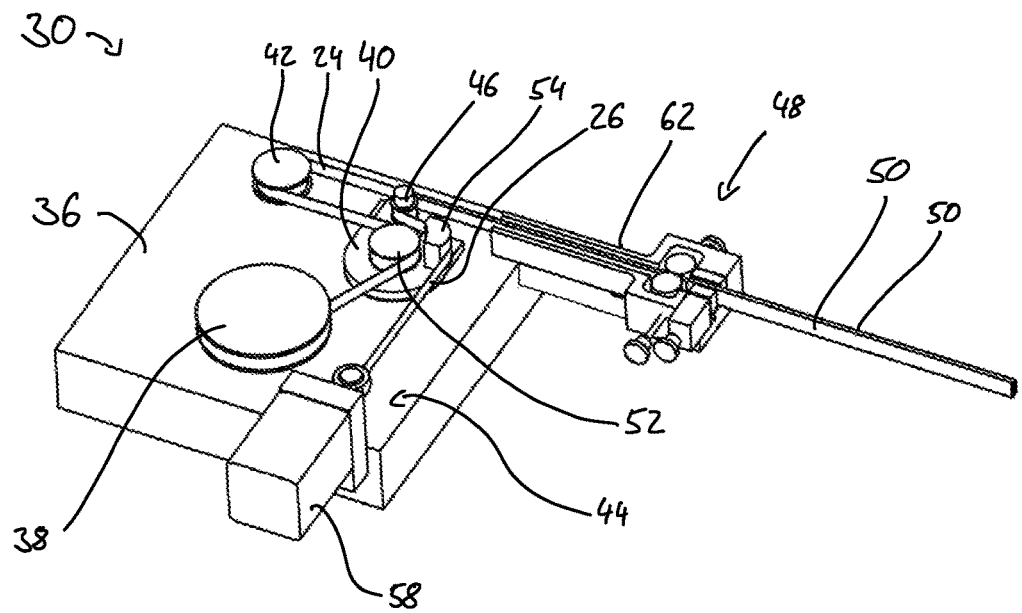
FIG. 4 shows a perspective view of one of the coil units of the pinning device according to FIG. 2, FIGS. 5,6 show schematically different parts of the pinning device within the second and first coil units as well as the electrode layout within the corresponding coil unit.

In FIG. 4, the second coil unit 30 is shown opened. The second coil unit 30 is located in relation to FIG. 2 on the left side of the chill roll 20.

The first coil unit 28 is constructed identically on the right side of the chill roll 20, merely as a mirror image. Any differences that exist will be indicated separately.

The second coil unit 30 comprises a housing 36, a rotatable coil 38, a voltage application device 40, a first deflecting roller 42, a mechanical tensioning device 44, a second deflecting roller 46, a damping device 48 as well as two insulating devices 50.

Figure 5:
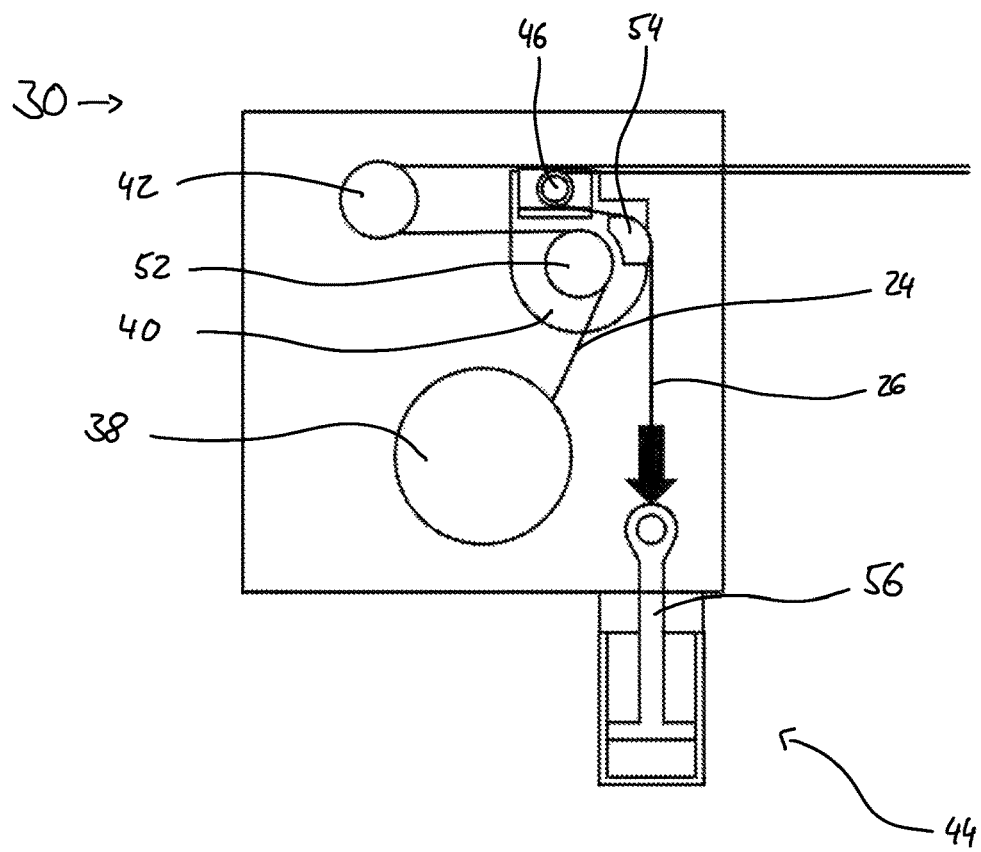

In FIG. 5, the coil unit 30 is shown simplified even further; only the two electrodes 24, 26 as well as the components for guiding the electrodes 24, 26 are shown. For example, the housing 36, the damping device 48 and the insulating devices 50 are not shown.

The first electrode 24 is coiled partially on the rotatable coil 38 and runs from the rotatable coil 38 to the voltage application device 40.

The voltage application device 40 is connected to the high-voltage source 32 electrically and comprises a roller 52 as well as a curved guiding surface 54.

The roller 52 guides the first electrode 24 and in doing so high voltage provided by the high-voltage source 32 is applied to the first electrode 24.

Then, the first electrode 24 runs to the first deflecting roller 42 and from there out of the coil unit 30 towards the pinning region 34.

The second electrode 26 is attached to the tensioning device 44 in the second coil unit 30. The tensioning device 44 comprises for this a tension bolt 56 that can be actuated by means of a motor 58 (FIG. 4).

The second electrode 26 runs then to the voltage application device 40. On the voltage application device 40, the second electrode 26 runs along the guiding surface 54.

The guiding surface 54 has a curved external side for guiding the second electrode 26. For example, the curved external side is a circular sector.

High voltage is applied to the second electrode 26 via the contact with the guiding surface 54, said high voltage being provided by the high-voltage source 32.

Figure 6:
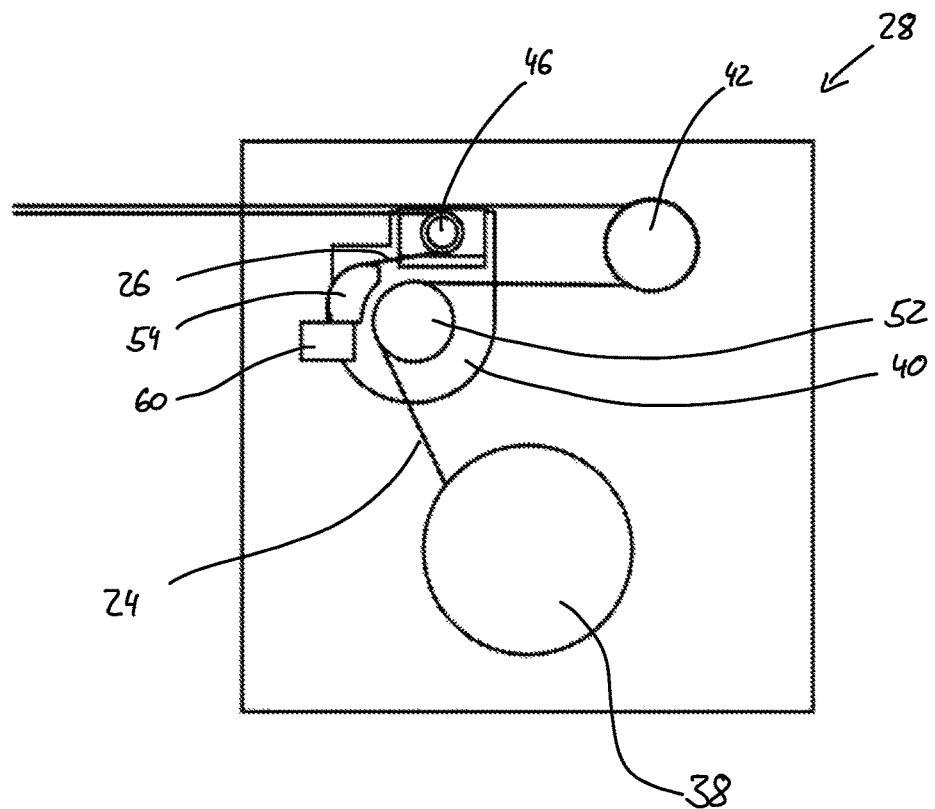

Then, the second electrode 26 runs via the second deflecting roller 46, through which it is arranged parallel to the first electrode 24. Both electrodes 24, 26 then run out of the second coil unit 30 through the pinning region 34 and finally into the first coil unit 28, which is reproduced in FIG. 6 in a reduced form.

The first electrode 24 runs in the reverse order as described for the second coil unit 30, initially via the first deflecting roller 24, the roller 52 of the voltage application device 40 and then onto the rotatable coil 38.

The voltage application device 40 of the first coil unit 28 is also connected to the high-voltage source 32 electrically. It is however also conceivable that each of the coil units 28, 30 have a separate high-voltage source.

Both rotatable coils 38 of the coil units 28, 30 can be powered. In this way, the first electrode 24 can be moved between the first coil unit 28 and the second coil unit 30. For example, the first electrode 24 is uncoiled from the rotatable coil 38 of the first coil unit 28, runs through the pinning region 34 into the second coil unit 30, where it is coiled by the rotatable coil 38 of the second coil unit 30.

In addition, the tensile force or the mechanical tension of the first electrode 24 can be set by means of the powered rotatable coil 38.

In contrast, the second electrode 26 is static in the shown embodiment. It runs into the first coil unit 28 and is guided by the second defection roller 46 to the voltage application device 40. Then, the second electrode 26 is fixed in position by means of the end piece 60 in the first coil unit 28. Thus, in contrast to the second coil unit 30, the first coil unit 28 does not comprise a tensioning device 44.

The tensile force or the mechanical tension of the second electrode 26 is set by means of the tensioning device 44.

It is however conceivable that rotatable coils are also provided for the second electrode 26 instead of the end piece 60 and the tensioning device 44, similar to the rotatable coils 38 for the first electrode 24. In this way, the second electrode 26 is also then configured to be moveable.

For example, a separate rotatable coil can be provided for each electrode 24, 26 in each coil unit 28, 30.

It is also conceivable that several of the electrodes 24, 26 are coiled on the same rotatable coil 38. In this case, a joint rotatable coil 38 is provided, for example, which comprises different regions for the different electrodes 24, 26. The mechanical tensions of the different electrodes 24, 26 can then be set by a tensioning device for each of the electrodes 24, 26.

As shown in FIG. 4, the electrodes 24, 26 run out of the coil units 28, 30 through the damping devices 48 and ultimately out of the coil units 28, 30 through the insulating devices 50.

The insulating devices 50 thus extend from the damping device 48 to the pinning region 34, as can be recognised in FIG. 2.

In particular, the insulating devices 50 extend along that region of the chill roll 20, on which no film 16 is applied.

Figure 7:
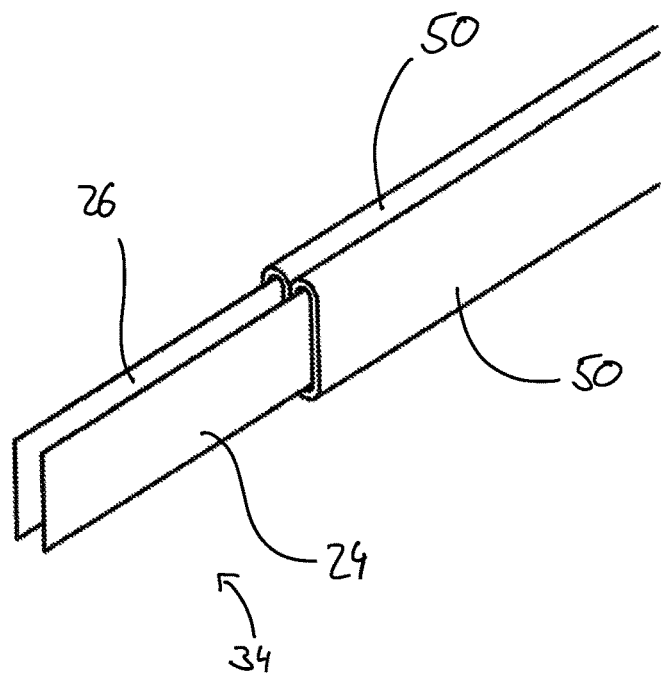
FIG. 7 shows a perspective view of the electrodes exiting the insulating devices of the coil unit according to FIG. 4.

In FIG. 7, a perspective view of the end of the insulating devices 50 is shown that points to the pinning region 34. In the shown representation, the electrodes 24, 26 exit from the insulating devices 50 and then run in the pinning region 34.

The insulating devices 50 are for example insulating conduits, insulating grommets and/or bushing insulators. They have an elongated cross section that is almost rectangular. For example, the corners are rounded or the short sides are formed by curved sections.

The inner diameters of the insulating devices 50 in their length are thus the width of the electrodes 24, 26 so that each one of the electrodes 24, 26 can be guided in one of the insulating devices 50.

In the shown embodiment, the insulating devices 50 surround the received electrodes 24, 26 along their circumference each completely.

It is however conceivable that the electrodes 24, 26 are not completely enclosed as long as they are enclosed from each other and/or towards the chill roll by the respective insulating device 50.

The insulating devices 50 are made of a plastic, in particular polyether ether ketone, PEEK. In particular, the PEEK is an annealed PEEK. Insulating devices 50 made of annealed PEEK have proven to be particularly durable.

Figure 8:
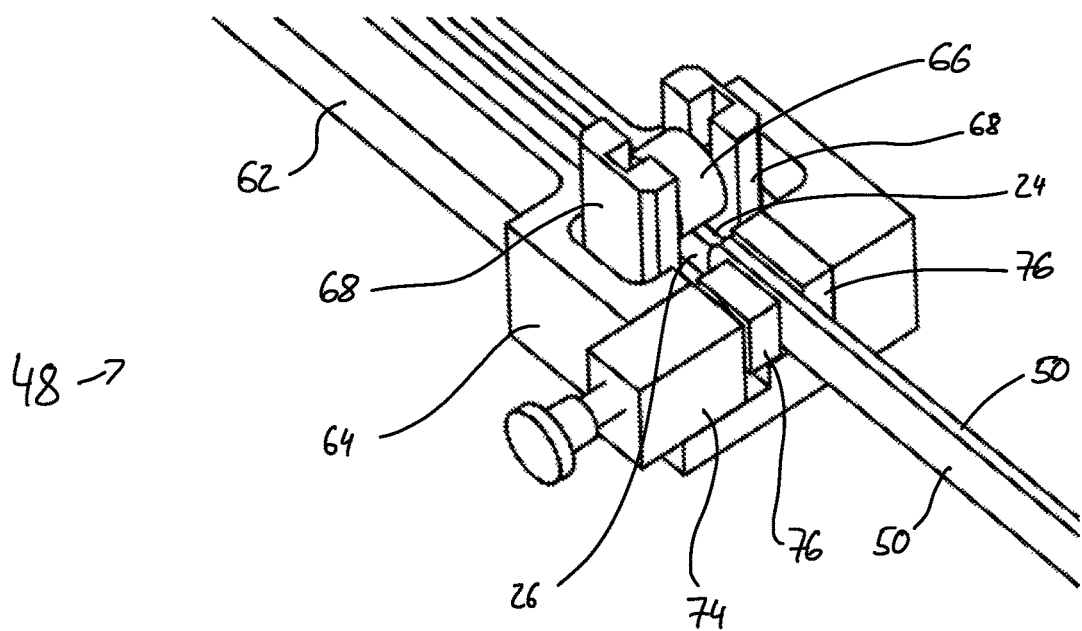
FIG. 8 shows a perspective view of a damping device of the coil unit according to FIG. 4.

The insulating devices 50 are attached at the exit of the damping device 48 by means of an attachment device 74, as can be seen in FIG. 8.

The attachment device 74 has, for example, vibration-damping elements 76, such as dampers made of an elastic material, between which the insulating devices 50 are clamped. The clamp can be set, for example, using a threaded fastener.

The damping devices 48 are provided with a side arm 62 that extends from the housing 36 of the corresponding coil unit 28, 30 in the direction towards the pinning region 34.

In particular, the length of the side arm 62 is adjustable, for example by means of a motor and a rack-and-pinion gear.

Figure 9:
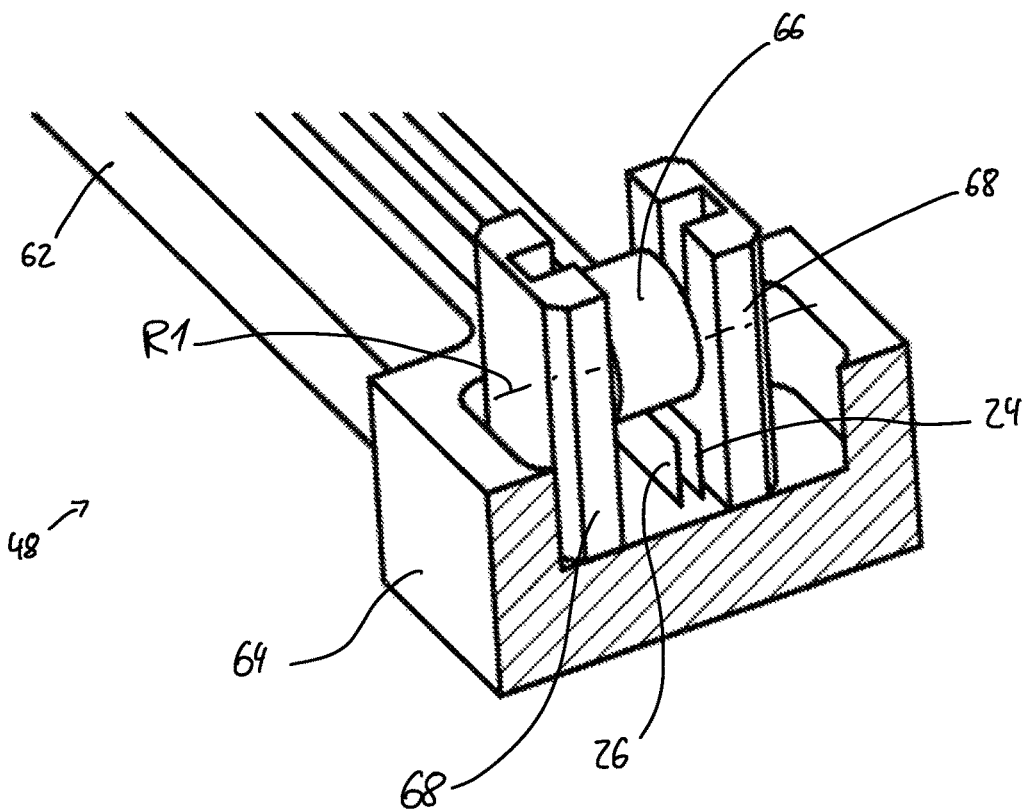
FIG. 9 shows a perspective section from the damping device of FIG. 8.

The damping device 48 is shown enlarged in FIGS. 8 and 9. The damping device 48 comprises a support frame 64 and a damping roller 66.

The support frame 64 has two supports 68 that are located on different sides of the two electrodes 24, 26. In other words, both electrodes 24, 26 run through between the two supports 68.

The damping roller 66 is located above, i.e. on the side of the electrodes 24, 26 facing away from the chill roll 20. The damping roller 66 is mounted rotatably on the support frame 64 about a rotational axis R1, wherein the rotational axis R1 is perpendicular to the longitudinal direction of the electrodes 24, 26 as well as perpendicular to the direction of the width of the electrodes 24, 26.

The damping roller 66 rests on the upper edges of both electrodes 24, 26, i.e. the edges facing away from the chill roll 20. Thus, it rotates with the movement of the first electrode 24 when being coiled or uncoiled.

In the direction of the width of the electrodes 24, 26, the damping roller 66 is mounted moveably, for example spring-loaded.

During the operation of the stretching unit 10, an electric high-voltage field is generated between the electrodes 24, 26 and the chill roll 20 by means of the pinning device 22, in particular the two parallel, strip-like electrodes 24, 26 to which high voltage has been applied. The film 16 passes through the electric field due to the rotary motion of the chill roll 20.

The surface of the chill roll 20 is electrically charged by the electric field and the polar molecules of the plastics material of the film 16 align. As a result, an electrostatic attraction forms between the chill roll 20 and the film 16. Through this force of attraction, the film 16 is applied to the chill roll 20 uniformly.

During operation, the first electrode 24 (and if applicable with the provision of corresponding rotatable coils 38 also the second electrode 26) is moved continuously along its longitudinal direction, i.e. unwound in the first coil unit 28 and wound in the second coil unit 30, or vice versa. In this way, deposits caused by the evaporating plastics material of the film 16 are transported away, thereby increasing the homogeneity of the electric field.

Deposits are also reduced by the low voltage applied to the electrodes 24, 26. The low voltages forms a current, termed a heater current, through each of the electrodes 24, 26 from the first coil unit 28 to the second coil unit 30 (or vice versa) with a strength of current between 1 A and 8 A.

For example, the strength of current through an electrode 24, 26 formed as a 3 mm strip is between 2 and 2.5 A and through an electrode 24, 26 formed as a 12.7 mm strip is approximately 7 A. In using a wire as the electrode 26, the currents are lower.

The electrodes 24, 26 are not grounded so that a crack in an electrode 24, 26 interrupts the current.

The electrodes 24, 26 heat up as a result of the current, thereby causing the evaporation of the plastics material of the film 16 to condense less strongly as condensate on the electrodes 24, 26.

In spite of the mechanical tension applied to the electrodes 24, 26 by the rotatable coil 38 and the tensioning device 44, the electrodes 24, 26 can vibrate, for example with an amplitude perpendicular to the lateral faces, in the direction of the width of the electrodes 24, 26 and/or about the longitudinal axis of the electrodes 24, 26. The damping device 48 dampens or prevents these possible vibrations of the electrodes 24, 26 so that the electric field remains constant. The quality of the pinning is thus increased further.

It is also conceivable that vibrations are prevented by an undulating layout of the electrodes 24, 26 in the pinning region 34. For this purpose, the pinning device 22 comprises then a bracket with pins about which the electrodes 24, 26 are guided.

By using both strip-shaped electrodes 24, 26, the electric field is at a maximum on the film surface at the point which first comes into contact with the chill roll 20. In this way, the high voltage can be reduced without lowering the quality of the pinning, sparkovers are reduced as a result.

Figure 10:
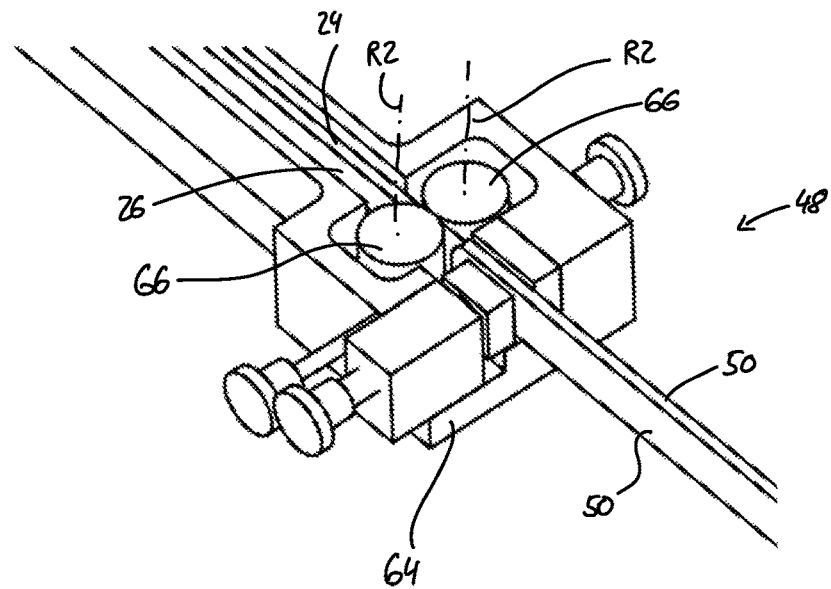
FIG. 10 shows a second embodiment of a damping device for a coil unit of a pinning device according to the disclosure.
Figure 11:
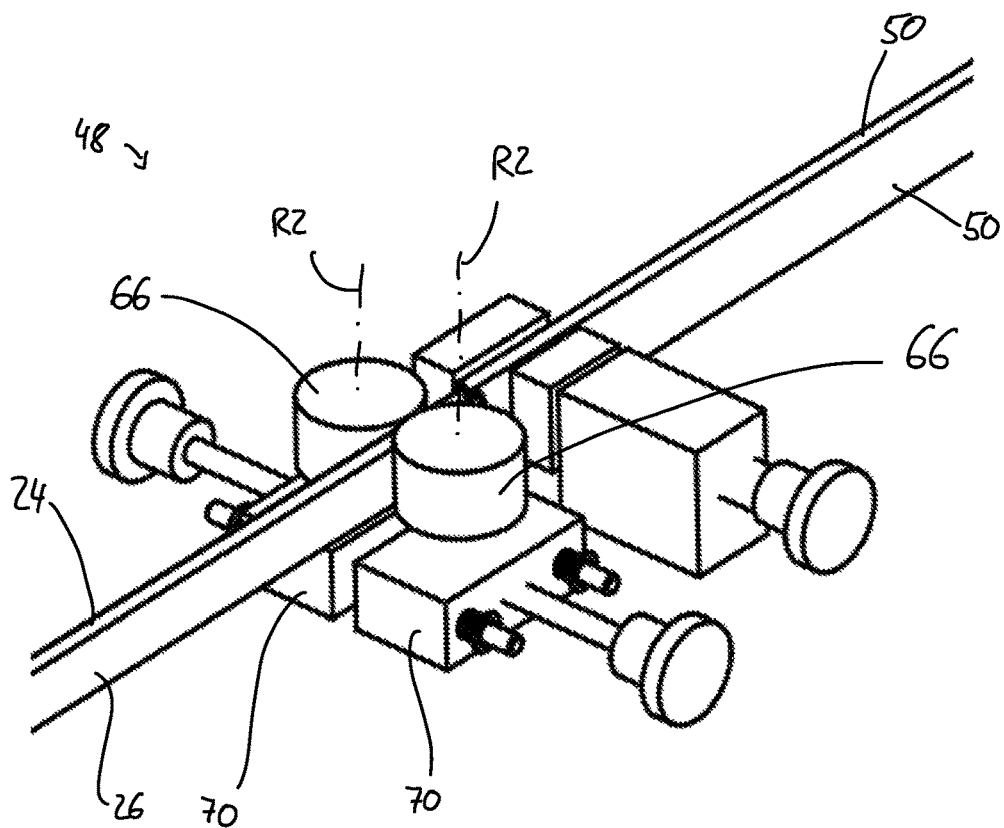
FIG. 11 shows the damping device according to FIG. 10 in another view and partially opened.

In FIGS. 10 and 11, a second embodiment of the casting unit 12 according to the disclosure and/or pinning device 22 according to the disclosure are shown. This corresponds substantially to the first embodiment so that only the differences are discussed hereinafter. Identical and functionally equivalent parts are provided with the same reference signs.

The FIGS. 10 and 11 show a damping device 48 of a second embodiment of the pinning device 22.

In this second embodiment, the damping device 48 comprises two damping rollers 66 that each are attached to a corresponding bearing block 70.

Each bearing block 70 is spring-mounted perpendicular to the lateral faces of the electrodes 24, 26 so that the damping rollers 66 are also spring-mounted.

Each of the damping rollers 66 is rotatable about a rotational axis R2 that is perpendicular to the longitudinal direction and parallel to the direction of the width of the electrodes 24, 26. In other words, the rotational axis R2 extends parallel to the lateral faces, but perpendicular to the longitudinal direction of the electrodes 24, 26.

Both electrodes 24, 26 run through between both damping rollers 66, wherein each one of the damping rollers 66 contacts the lateral face of one of the electrodes 24, 26. In particular, both electrodes 24, 26 still do not contact each other.

In other words, one of the electrodes 24 or 26 is allocated to each damping roller 66, with said electrode 24 or 26 running on its lateral face.

It is also conceivable that in addition to both damping rollers 66 of the second embodiment, a damping roller 66 is also present as shown for the first embodiment in order to increase the damping effect further.

In FIGS. 12 to 14, further embodiments of the pinning device 22 are shown which substantially correspond to the first embodiment. Therefore, only the differences are discussed hereinafter and the same parts and parts with the same function are given the same reference signs. In addition, they can also have the features of the second embodiment.

In FIG. 12, a third embodiment of the pinning device 22 is shown in a section similar to that of FIG. 3.

In this embodiment, the strip-shaped electrodes 24, 26 do not have the same width, but have different widths.

In the shown embodiment, the first electrode 24 has a smaller width than the second electrode 26. Similarly, it is conceivable that the second electrode 26 has a smaller width than the first electrode 24.

Moreover, the second electrode 26 is offset in relation to the first electrode 24 in the direction of its width. In this way, the electric field can be adapted to the specifics of the pinning device 22 or the casting unit 12, for example the slot die 18.

It is also conceivable that the pinning device 22 has three or more strip-shaped electrodes that run parallelly in the pinning region 34. One, several or all of these electrodes can be moveable in their longitudinal direction.

In FIG. 13, a fourth embodiment of the pinning device 22 is shown in a section similar to that of FIG. 3.

In this fourth embodiment, the second electrode 26 is not strip-shaped, but is wire-like, in particular formed as a wire. Almost any other cross-section of the second electrode 26 is also conceivable.

The second electrode 26 runs in the fourth embodiment at the same spacing to the chill roll 20 as the first electrode 24, more specifically the edge of the first electrode 24 facing the chill roll 20.

It is however conceivable that the second electrode 26 is arranged further away from the chill roll 20.

In FIG. 14, a fifth embodiment of the pinning device 22 is shown in a section similar to that of FIG. 3.

In this fifth embodiment, the pinning device 22 comprises a third electrode 72 in addition to the first electrode 24 and the second electrode 26. The pinning device 22 of the fifth embodiment thus has three electrodes 24, 26, 72.

The first electrode 24 is strip-shaped. The second electrode 26 and the third electrode 72 are formed to be wire-like, in particular as wires. Almost any other cross-section of the second electrode 26 and/or the third electrode 72 is also conceivable.

The second and the third electrodes 26, 72 are arranged on different sides of the first electrode 24. The second and the third electrodes 26, 72 can have the same spacing to the first electrode 24.

In the shown example, however, the first electrode 24 is not situated directly between the second and third electrodes 26, 72, i.e. the first electrode 24 does not form an imaginary connecting line between the second electrode 26 and the third electrode 72.

The first electrode 24 is offset towards the chill roll 20 in relation to the second and third electrodes 26, 72.

The second and the third electrodes 26, 72 can have the same spacing to the chill roll 20.

Through the different arrangements and constructions of the electrodes 24, 26, 72, the electric field can be suitably formed for the respective application, in particular for the respective plastics material being used.

It is also conceivable that the second electrode 26 and/or the third electrode 72 are strip-shaped.

Similarly, high voltage and/or low voltage can be applied to each of the three electrodes 24, 26, 72, which can be designed either to be moveable in the longitudinal direction or static.

The invention claimed is:

1. A pinning device for an electrostatic pinning of a film on a chill roll, comprising: a first coil unit, a second coil unit, a pinning region situated between the first and second coil units, a high-voltage source as well as at least two electrodes, wherein at least a first electrode of the at least two electrodes is strip-shaped, wherein the at least two electrodes run from the first coil unit to the second coil unit in the pinning region, and
wherein high voltage is applied to the at least two electrodes by the high-voltage source.

2. The pinning device according to claim 1, wherein a second electrode of the at least two electrodes is strip-shaped or is wire-like.

3. The pinning device according to claim 1, wherein a third electrode is provided, wherein the third electrode is strip-shaped or is wire-like.

4. The pinning device according to claim 1, wherein the at least two electrodes run parallel to each other or each comprise two lateral faces, wherein the at least two electrodes each face each other with one of their lateral faces.

5. The pinning device according to claim 1, wherein the at least two electrodes have a spacing to each other of 3 mm to 15 mm in the pinning region.

6. The pinning device according to claim 1, wherein at least one of the at least two electrodes have a same width, the at least two electrodes have different widths or the width of the at least two electrodes is between 3 mm and 15 mm.

7. The pinning device according to claim 1, wherein the at least two electrodes are arranged offset in a direction of their width or arranged to be flush.

8. The pinning device according to claim 1, wherein one, several or all of the at least two electrodes are moveable between the first coil unit and the second coil unit in their longitudinal direction.

9. The pinning device according to claim 8, wherein at least one rotatable coil is provided in the first and in the second coil unit, on said at least one rotatable coil, wherein several or all of the at least two electrodes are partially coiled.

10. The pinning device according to claim 1, wherein a voltage application device is provided in at least one of the first and second coil units, said voltage application device connecting the at least two electrodes electrically to said at least one high-voltage source.

11. The pinning device according to claim 10, wherein the voltage application device comprises at least one of a roller, on which the first electrode is guided, or a curved guiding surface, along which at least one of a second electrode or a third electrode is guided.

12. The pinning device according to claim 1, wherein at least one of the first coil unit or the second coil unit comprises a damping device that is configured to dampen vibrations of the at least two electrodes in the pinning region.

13. The pinning device according to claim 12, wherein the damping device comprises a damping roller whose rotational axis is perpendicular to a longitudinal direction and perpendicular to a direction of the width of the at least two electrodes, wherein the damping roller is mounted movably in the direction of the width and rests on one edge of each of the at least two electrodes.

14. The pinning device according to claim 13, wherein the damping device comprises two damping rollers whose rotational axis are perpendicular to the longitudinal direction and parallel to the direction of the width of the at least two electrodes, wherein each of the at least two electrodes touches one of the two damping rollers.

15. The pinning device according to claim 1, wherein the pinning device further comprising several insulating devices, which extend from the corresponding first and second coil units towards the pinning region, wherein the at least two electrodes run through the insulating devices.

16. The pinning device according to claim 15, wherein at least one of the several insulating devices is provided for each of the at least two electrodes on each of the first and second coil units.

17. The pinning device according to claim 15, wherein the insulating devices are attached in a vibration-damping manner to the damping device.

18. The pinning device according to claim 1, wherein low voltage is applied to at least one of the at least two electrodes.

19. A casting unit comprising a slot die, a chill roll and a pinning device, the pinning device comprising a first coil unit, a second coil unit, a pinning region situated between the first and second coil units, a high-voltage source as well as at least two electrodes, wherein at least a first electrode of the at least two electrodes is strip-shaped, wherein the at least two electrodes run from the first coil unit to the second coil unit in the pinning region, and wherein high voltage is applied to the at least two electrodes by the high-voltage source.

20. A stretching unit for producing a film, comprising an oven and the casting unit according to claim 19.

* * * * *